(12) United States Patent
Rao Ganesh et al.

(10) Patent No.: US 10,532,475 B2
(45) Date of Patent: Jan. 14, 2020

(54) GROOMING SYSTEM WITH ADAPTIVE LIGHTING AND OPERATING METHOD

(71) Applicant: KONINKLIJKE PHILIPS N.V., Eindhoven (NL)

(72) Inventors: Ramachandra Rao Ganesh, Groningen (NL); Jeroen Christian Nijdam, Eelderwolde (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/332,008

(22) PCT Filed: Sep. 11, 2017

(86) PCT No.: PCT/EP2017/072670
§ 371 (c)(1),
(2) Date: Mar. 11, 2019

(87) PCT Pub. No.: WO2018/050570
PCT Pub. Date: Mar. 22, 2018

(65) Prior Publication Data
US 2019/0358835 A1    Nov. 28, 2019

(30) Foreign Application Priority Data

Sep. 14, 2016  (EP) ..................................... 16188844

(51) Int. Cl.
*B26B 19/46* (2006.01)
*B26B 19/38* (2006.01)
*H05B 37/02* (2006.01)

(52) U.S. Cl.
CPC ............ *B26B 19/46* (2013.01); *B26B 19/388* (2013.01); *H05B 37/0218* (2013.01)

(58) Field of Classification Search
CPC ....... B26B 19/46; B26B 19/38; B26B 19/388; H05B 37/0218
See application file for complete search history.

(56) References Cited

U.S. PATENT DOCUMENTS

2007/0107229 A1    5/2007  Ribal
2008/0222905 A1    9/2008  Nishimura
(Continued)

FOREIGN PATENT DOCUMENTS

EP    1128316 B1    8/2001
EP    2680192 A2    1/2014
(Continued)

*Primary Examiner* — Daniel D Chang

(57) ABSTRACT

The present disclosure relates to a grooming system having an adaptive lighting system (70) and a personal care appliance (50), particularly a hair cutting appliance, the adaptive lighting system (70) comprising at least one sensor (74, 76, 78, 80) that is arranged to detect an illumination-indicative value in the vicinity of a treatment head (54) of the appliance (50), at least one light source (72, 110, 134) that is arranged to illuminate a treatment zone, a lighting control unit (86, 102) operatively coupled with the at least one sensor (74, 76, 78, 80) and the at least one light source (72, 110, 134), wherein the lighting control unit (86, 102) is arranged to control the at least one light source (72, 110, 134) dependent on the illumination-indicative value detected by the at least one sensor (74, 76, 78, 80), and wherein the lighting control unit (86, 102) is arranged to increase a target illumination level when a detected actual illumination level is low, and to decrease a target illumination level when a detected actual illumination level is high. The present disclosure further relates to a method of operating an adaptive lighting system (70) and to a corresponding computer program.

15 Claims, 5 Drawing Sheets

(56) References Cited

U.S. PATENT DOCUMENTS

| | | | |
|---|---|---|---|
| 2009/0203320 A1 | 12/2009 | Davis | |
| 2010/0186234 A1* | 7/2010 | Binder | A45D 26/00 30/34.05 |
| 2010/0246904 A1 | 9/2010 | Yamashita | |
| 2010/0270953 A1 | 10/2010 | Hente | |
| 2011/0018985 A1* | 1/2011 | Zhu | A45D 44/00 348/61 |
| 2012/0320180 A1* | 12/2012 | Binder | A45D 26/00 348/77 |
| 2014/0016837 A1 | 1/2014 | Nechyba | |
| 2016/0042557 A1 | 2/2016 | Lin | |

FOREIGN PATENT DOCUMENTS

| | | |
|---|---|---|
| EP | 2857809 A1 | 4/2015 |
| WO | 2003015999 A2 | 2/2003 |
| WO | 2011018781 A1 | 2/2011 |
| WO | 2014198615 A1 | 12/2014 |
| WO | 2014206852 A1 | 12/2014 |

* cited by examiner

GROOMING SYSTEM WITH ADAPTIVE LIGHTING AND OPERATING METHOD

This application is the U.S. National Phase application under 35 U.S.C. § 371 of International Application No. PCT/EP2017/072670, filed on Sep. 11, 2017, which claims the benefit of International Application No. 16188844.1, filed Sep. 14, 2016. These applications are hereby incorporated by reference herein.

FIELD OF THE INVENTION

The present disclosure relates to a grooming system comprising an adaptive lighting system and a personal care appliance, particularly for a hair cutting appliance, the system comprising at least one sensor and at least one light source, wherein a lighting control unit is provided that is operatively coupled with the at least one sensor and the at least one light source.

The present disclosure further relates to an arrangement implementing a respective adaptive lighting system. The disclosure further relates to a method of operating an adaptive lighting system for a personal care appliance and to a corresponding computer program.

BACKGROUND OF THE INVENTION

WO 2003/015999 A2 discloses an electrical shaving apparatus that incorporates a light source, wherein a switch is provided to actuate the light source. In one embodiment, a sensor switch is provided that detects an application of pressure or force on a shearing foil which triggers an actuation of the light source.

As used herein, personal care appliances may involve, but are not limited to, grooming appliances, hair cutting appliances, trimming appliances, shaving appliances, hair styling appliances, massage appliances, curling appliances, dental care appliances, skin care appliances, etc.

Frequently, personal care appliances are used in a self-treating fashion by a user. This may take place in a bathroom or a similar environment. For instance, shaving and trimming processes for the head hair/scalp hair and the facial hair are typically performed in front of a mirror. It has been observed that lighting conditions have a great influence on the visibility of the appliance and the to-be-treated region which also involves that ease-of-operation is greatly dependent on the actual illumination state of the to-be-treated zone.

For instance, when a hair cutting appliance, particularly a shaving appliance, is used for cutting facial hair, illumination conditions may vary at the transition from the chin to the neck of the user. For instance, when a top frontal light source is used which is for instance arranged above a bathroom mirror or even at the ceiling, a frontal region of the face is sufficiently illuminated, whereas the neck portion that is covered by the skin, is considerably dark and shadowy. By contrast, when a bottom light source is used which is arranged to upwardly illuminate the treatment zone, the neck beneath the chin may be sufficiently illuminated which, however, may have the effect that then the frontal face region is darkened with respect to the illuminated neck region.

Therefore, a user may have to turn and/or bow his/her head so as to make sure that the actual treatment zone is sufficiently illuminated. This may cause discomfort and inconveniences.

A potential remedy involves providing a plurality of light sources that are for instance arranged in the vicinity of a bathroom mirror so as to illuminate the user, particularly the face of the user, from various angles and at different illumination directions.

However, also an overall lighting approach may involve several drawbacks. For instance, if an overall brightness level is way too high, this may also cause discomfort. Further, brightness and darkness are typically perceived in a relative fashion. Hence, a certain contrast ratio between illuminated and non-illuminated regions would further facilitate handling the personal care appliance, even in considerably dark environments.

Hence, there is still room for improvements in adaptive lighting systems for personal care appliances.

SUMMARY OF THE INVENTION

It is an object of the present disclosure to provide a grooming system comprising an adaptive lighting system and a personal care appliance, particularly a hair cutting appliance, that facilitates a personal care treatment by providing improved lighting conditions involving a selective illumination of an actual treatment zone. Preferably, the adaptive lighting system increases a contrast ratio between the actual treatment zone and surrounding regions. This may further improve the visibility of the appliance and the to-be-processed portion. It would be further advantageous to provide an easy-to-operate adaptive lighting system which may be operated in an energy-saving fashion. Preferably, the adaptive lighting system is capable of on-demand operation. Preferably, the adaptive lighting system is capable of expanding potential application fields for the personal care appliance.

It would be further beneficial to provide a personal care appliance that is operatively coupled with an adaptive lighting system. A further object of the present disclosure is to provide a personal care appliance, particularly a hair cutting appliance, that incorporates an adaptive lighting system which may be powered in a wireless fashion by an integrated battery.

It is a further object of the present invention to provide a method of operating an adaptive lighting system for a grooming system comprising a personal care appliance and a corresponding computer program.

In a first aspect of the present disclosure, an grooming system comprising an adaptive lighting system and a personal care appliance, particularly a hair cutting appliance, is presented, the adaptive lighting system comprising:

at least one sensor that is arranged to detect an illumination-indicative value in the vicinity of a treatment head of the appliance,
  at least one light source that is arranged to illuminate a treatment zone,
  a lighting control unit operatively coupled with the at least one sensor and the at least one light source,
  wherein the lighting control unit is arranged to control the at least one light source dependent on the illumination-indicative value detected by the at least one sensor, and
  wherein the lighting control unit is arranged to increase a target illumination level when a detected actual illumination level is low, and to decrease a target illumination level when a detected actual illumination level is high.

This aspect is based on the insight that at least one sensor may be provided that is capable of sensing an illumination-indicative value based on which the at least one light source may be operated. Hence, the at least one light source may be operated in an adaptive fashion. When it is detected that an actual treatment zone, in the vicinity of the treatment head of the appliance, is too dark, the at least one light source may be enabled or configured to activate or increase the output thereof. Rather, when it is detected that a sufficient illumination level is present, it may be decided to maintain the state of the at least one light source and/or to reduce the output or even to deactivate the at least one light source by appropriate control measures.

As used herein, a high illumination level may be present when an actually detected illumination state is above (or below) a defined threshold. Rather, a low illumination level may be present when an actually detected illumination state is below a defined threshold. In one embodiment, the threshold for the low level and the threshold for the high level are the same. However, it may be also envisaged to define a desired illumination range in which the actual illumination level should be kept. Hence, only in case the actual illumination level exceeds a low border (low threshold) or a high border (high threshold), respective adaptive control measures may be taken. Control measures may also involve maintaining a current or steady state.

However, in an alternative embodiment, the lighting control unit may be further arranged to maintain a target illumination level when a detected actual illumination level is at a desired level or within a desired range. Hence, a further control state may be present.

As used herein, in some embodiments, thresholds are basically defined by the level of luminance needed for achieving the personal care treatment task, for instance the grooming operation. In some embodiments, the required luminance level is influenced by at least one of the level of reflected light from the existing light sources in the actual environment, e.g. the bathroom, the direct light from the light source in the appliance to the user, and the level of acceptable luminance for the eye avoiding discomfort glare. Further influencing factors may be envisaged.

As used herein, an illumination-indicative value is a sensed value that is directly or mediately indicative of the actual illumination level. In a first exemplary embodiment, the at least one sensor is at least one light sensor. The light sensor may be also referred to as Lux meter. Generally, the at least one sensor may be arranged as a relative illumination sensor or an absolute illumination sensor. To this end, reference sensors may be provided.

However, in another exemplary embodiment, the sensor may be arranged as a proximity sensor, for instance. It may be for instance detected that the appliance approaches a certain region or position. Such an event may also be indicative of an actual need for an increased illumination level.

The at least one light source may be referred to as adaptive light source. Needless to say, a plurality of light sources may be utilized. In a first exemplary embodiment, the at least one light source may be switched on and switched off by the lighting control unit in response to an actually detected illumination value that is present in the vicinity of the treatment head.

The at least one light sensor may be arranged as a photo-sensitive sensor or photodetector. This may involve CCD-sensors (charge-coupled devices), CMOS-sensors (complementary metal-oxide-semiconductor sensors), photodiode light sensors, photoresistors, semiconductor detectors, photovoltaic cells, etc.

The adaptive lighting system may be also referred to as adaptive brightness control system. The personal care appliance is particularly arranged as a manually-guided appliance or a hand-held appliance. Hence, the appliance may be basically freely operated for a personal care treatment. For instance, the appliance is arranged as a shaving and/or trimming appliance.

An adapted control of the at least one light source enables energy-saving or power-saving operation of the lighting system. Hence, only when a respective demand for an increased illumination level is present, the at least one light source is operated accordingly.

The treatment zone may involve a skin or hair portion of a user. The treatment zone may involve the facial or scalp region, the neck, etc. However, further treatment zones including further body parts may be envisaged.

In an exemplary embodiment of the lighting system, the lighting control unit is arranged to apply at least one of the following adaptive measures:

dim or lighten at least one of the at least one light source,
enable or disable the at least one of the at least light source,
adjust a luminous power level of at least one of the at least one light source, and
define and adjust an illuminated zone dependent on the illumination level detected by the at least one sensor.

In addition or in the alternative, the lighting control unit is arranged to apply at least one of the following adaptive measures:

define and adjust an illuminated zone dependent on the visual threshold of the human eye (retina) to prevent glare, and
define and adjust a reflected illuminated zone dependent on the visual threshold of the human eye (retina).

As indicated above, at least in some embodiments, a plurality of light sources is used. This may involve that selected ones of the plurality of light sources may be enabled or disabled. However, also a dimming or lighting control for a selected one of the plurality of light sources may be envisaged.

The illuminated zone may be defined and adjusted by selectively enabling or disabling selected ones of the plurality of light sources. However, at least in some embodiments, also a light cone of a single light source as such may be adjusted by appropriate beam shaping or cone shaping measures. To this end, respective beam shaping optics may be used. Exemplary embodiments may involve, but are not limited to, light guiding optics, a combination of collimating and/or diverging optics, etc.

In a further exemplary embodiment of the lighting system, the lighting control unit is arranged to control a luminance distribution value dependent on an illumination level detected by the at least one sensor.

This may for instance involve that the at least one light source is operated in such a way that a center of the illuminated zone is brighter than a boundary region.

In a further exemplary embodiment of the lighting system, the lighting control unit is arranged to adjust the illumination level dependent on at least one of a relative orientation and a relative position of the appliance.

This may involve, in at least some embodiments, the use of additional sensors that are arranged to sense the appliance displacement velocity, direction of advancing and to determine the positional parameters in 3D space with respect to the body zone of interest. Therefore, the operational parameters of the adaptive lighting may be influenced by these observations and considerations.

By way of example, a light intensity and/or an illuminated field of view may be adjusted when the appliance approaches the treatment zone. However, when the appliance, particularly the treatment head thereof, is facing away from the treatment zone, the at least one light source may be dimmed or deactivated as a respective position/orientation indicates that currently no primary processing treatment is planned.

In some embodiments, a sensor-array may be utilized. This may involve that pixel arrangements, e.g. CCD or CMOS pixel arrangements, are provided that enable a two-dimensional light sensing which also involves luminance distribution detection. Hence, a video sensor or video imager may be used for the detection of the illumination state.

In a further exemplary embodiment of the lighting system, a set of sensors is provided that is arranged in a distributed fashion, wherein the set of sensors is operable to sense a set of illumination-indicative values, particularly illumination level values. The set of sensors may be also referred to as sensor array. The sensor array could also be a distributed array of one pixel arrangement across the appliance and not necessarily fixed to one location.

In a further exemplary embodiment of the adaptive lighting system, a set of light sources is provided that is arranged in a distributed fashion, wherein the lighting control unit is arranged to control at least one light source of the set of light sources independently of the remaining light sources. A light source may be for instance formed by a single LED (light emitting diode). Hence, a set or array of LEDs may be provided. Needless to say, light sources may also involve organic LEDs (OLED), light bulbs, etc.

In a further exemplary embodiment of the adaptive lighting system, the lighting control unit is arranged to adjust a power consumption level of the at least one light source. Hence, assuming that the light source is arranged at the appliance, an operating time may be increased by reducing the energy consumption of the light source whenever possible.

In a further exemplary embodiment of the lighting system, the at least one light sensor is arranged at the appliance. In an alternative embodiment, the at least one light sensor is separate from the appliance. Further, combined embodiments may be envisaged wherein at least one sensor is arranged at the appliance and at least another sensor is separate from the appliance. Preferably, either sensor is operatively coupled with the lighting control unit.

In a further exemplary embodiment of the lighting system, the at least one light source is arranged at the appliance. In an alternative embodiment, the at least one light source is remote from the appliance. However, again also combined embodiments may be envisaged, wherein at least one light source is arranged at the appliance and at least another one is arranged remote from the appliance.

In yet another exemplary embodiment, the lighting system comprises at least one further augmenting sensor that enhances the operating capability of the lighting control unit.

In one embodiment, the lighting system further comprises at least one orientation sensor arranged to detect an actual orientation of the appliance, wherein the lighting control unit is arranged to control the at least one light source dependent on an actual orientation of the appliance with reference to the treatment body zone of interest.

In another exemplary embodiment, the lighting system further comprises at least one operation state sensor arranged to detect an actual operation state of the appliance, wherein the lighting control unit is arranged to control the at least one light source dependent on an actual orientation of the appliance. An operation state may include at least one of an enabled state, a disabled state, and a treatment state, wherein the treatment head is actuated, etc. The lighting system may be also arranged to modulate its intensity based on the velocity of the appliance with respect to the treated body zone, enabling instantaneous visual movement guidance.

In a further exemplary embodiment, the lighting system further comprises at least one relative position sensor, particularly at least one proximity sensor, that is arranged to detect an actual relative position of the appliance, wherein the lighting control unit is arranged to control the at least one light source dependent on an actual position of the appliance. Hence, it may be detected whether the appliance approaches a treatment zone or another zone, for instance.

Needless to say, in a further exemplary embodiment, a respective set of augmenting sensors is used that further enhance the operation and control scope of the lighting control unit.

In yet another exemplary embodiment of the lighting system, the lighting control unit is at least partially incorporated in a mobile computing device, particularly a mobile phone, a tablet computer or a mobile computer, wherein the lighting control unit is arranged to communicate with the at least one sensor and the at least one light source in a wireless fashion.

Hence, controlling the adaptive lighting system may be performed in a distributed fashion, wherein operations that require considerable processing power are shifted to the mobile computing device. As a result, implementation costs for the adaptive lighting system may be greatly reduced.

In yet another aspect of the present disclosure there is provided a method of operating an adaptive lighting system of a grooming system comprising a personal care appliance, particularly a hair cutting appliance, the method comprising:
  providing at least one light source that is arranged to illuminate a processing zone for the appliance,
  providing at least one sensor that is arranged to detect an illumination level in the vicinity of a treatment head of the appliance,
  controlling the at least one light source dependent on an illumination level detected by the at least one sensor, involving:
  increasing a target illumination level when a detected actual illumination level is low, and
  decreasing a target illumination level when a detected actual illumination level is high.

The method may further involve the step of modulating both the increase and decrease of the illumination level to a certain level or range with respect to the defined visual threshold of the human eye (retina).

Preferably, the method may be implemented in combination with the adaptive lighting system according to at least one embodiment as described herein.

Controlling the at least one light source dependent on an illumination level detected by the at least one sensor may further involve maintaining a target illumination level when a detected actual illumination level is at a desired level or within a desired range.

In still another aspect of the present disclosure, there is presented a computer program comprising program code means for causing an adaptive lighting system of a grooming system comprising a personal care appliance, particularly a hair cutting appliance, to carry out the steps of the operating method as described herein when said computer program is carried out on a computing device that is operatively coupled with or forms part of the adaptive lighting system.

Preferred embodiments of the disclosure are defined in the dependent claims. It shall be understood that the claimed method has similar and/or identical preferred embodiments as the claimed device and as defined in the dependent claims.

BRIEF DESCRIPTION OF THE DRAWINGS

These and other aspects of the disclosure will be apparent from and elucidated with reference to the embodiments described hereinafter. In the following drawings

DETAILED DESCRIPTION OF THE EMBODIMENTS

Figure 1:
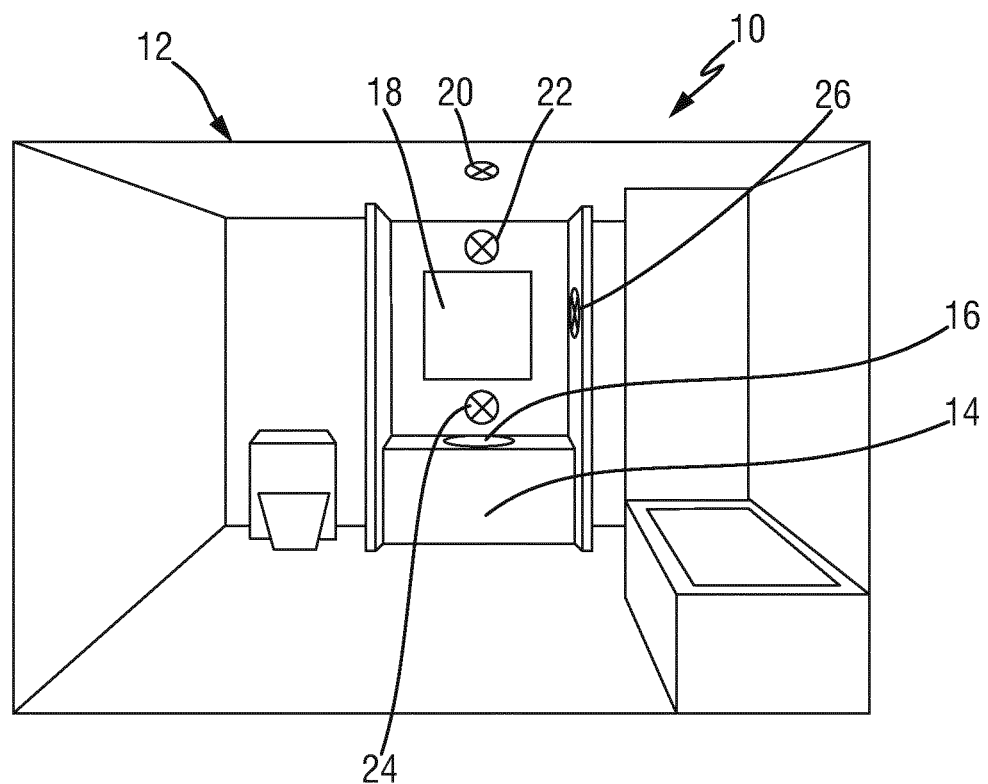
FIG. 1 shows a simplified schematic perspective view of an exemplary lighting situation in a bathroom.

FIG. 1 is a schematic perspective view of an exemplary lighting situation 10 which is present in a bathroom 12. In the bathroom 12, a washbasin 14 is present that includes a sink 16. Above the sink 16, a mirror 18 which may be also referred to as bathroom mirror is present. A user may assume a position in front of the mirror 18 then performing a personal care treatment, for instance a hair cutting, trimming or shaving operation.

A personal care treatment typically involves handling a movable hand-guided appliance. This may involve approaching and contacting processing zones at the user, involving the facial region, the neck region, the chin region, the hair region/scalp region, further body parts, etc. Hence, an adequate illumination of the processing zone is necessary so as to facilitate handling the appliance.

For instance, a ceiling lighting 20 may be present in the bathroom 12. Further, a top lighting 22 may be present which is arranged above the mirror 18. Also a bottom lighting 24 may be present which is arranged below the mirror 18. Indicated by reference numeral 26, also a lateral or side lighting may be present. Depending on the orientation and position of the respective light sources 20, 22, 24, 26, a different lighting situation may be present, including a certain contrast ratio and gradient. As used herein, the term contrast ratio may be regarded as the ratio of the luminance of the brightest spot to that of the darkest spot is a field of view. Similar definitions may be applied as well. Further, the term contrast gradient may be regarded as a measure for (spatial and/or directional) changes in luminance in a field of view.

Figure 2:
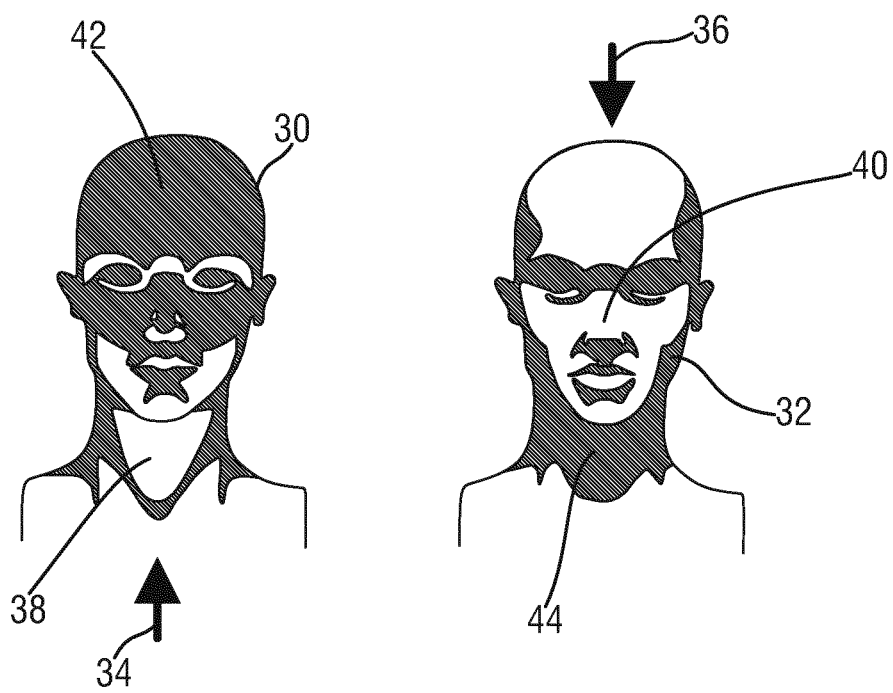
FIG. 2 shows two frontal views of subjects or users that are exposed to different lighting conditions that differently illuminate the faces of the subjects.

In this context, further reference is made to FIG. 2 illustrating a respective frontal view of a head of two exemplary users or subjects 30, 32. Block arrows 34, 36 indicate a respective direction of illumination. The subject 30 is illuminated by a bottom light source, refer to the bottom lighting 24 in FIG. 1. The subject 32 is illuminated by a top light source, refer to the ceiling lighting 20 and/or the top lighting 22 shown in FIG. 1.

Hence, when the subject 30, 32 is placed in front of the mirror 18, depending on an actual lighting configuration a different illumination state may be present at the face/neck portion of the subject 30, 32. The subject 30 is illuminated from below, therefore, a frontal neck and chin portion 38 is illuminated and bright, wherein remaining portions including an upper face and the forehead forms a considerably dark zone 42. Further, assuming that no further light sources are present, a certain considerably high contrast ratio is present. By contrast, the subject 32 is illuminated from above. Hence, the forehead portion and an upper face portion are considerably bright and form an illuminated zone 40. Accordingly, due to the head shape of the subject 32, the chin and neck portion form a dark zone 44. Again, a certain considerably high contrast between the illuminated zone 40 and the dark zone 44 is present.

It would be beneficial to provide a lighting system that illuminates a currently to-be-processed region in an adaptive fashion, and that preferably enables a considerable contrast ratio that facilitates a personal care operation.

Figure 3:
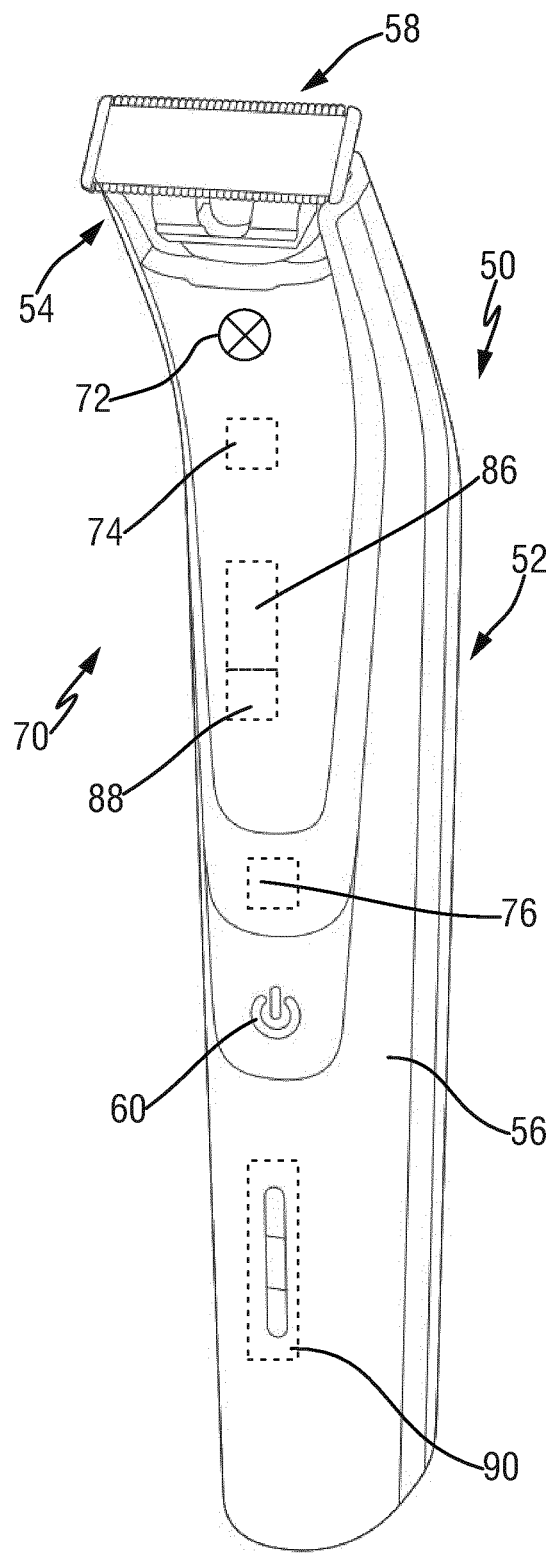
FIG. 3 is a perspective view of an exemplary embodiment of a personal care appliance that is arranged as a hair cutting appliance, the appliance incorporating an adaptive lighting system.

FIG. 3 illustrates, by means of a schematic perspective view, a personal care appliance 50 that is arranged as a hair cutting appliance. The appliance 50 comprises a housing 52 that is arranged in an elongated fashion. At a first end of the housing 52, a treatment head 54 is provided. Further, a handling section 56 is formed at the housing 52. In the exemplary embodiment of the personal care appliance 50 shown in FIG. 3, a blade set 58 is arranged at the treatment head 54. As already indicated above, the personal care appliance 50 may be also arranged as a grooming appliance, a shaving appliance, a trimming appliance, a massage appliance, a skin treatment appliance, etc.

User controls 60 are formed at the housing 52 which may include, but are not limited to, on/off buttons, status indicators, etc.

The personal care appliance 50 is operatively coupled with an adaptive lighting system 70. In accordance with the embodiment shown in FIG. 3, the personal care appliance 50 incorporates the adaptive lighting system 70. The adaptive lighting system 70 comprises a light source 72 which is arranged in the vicinity of or at the treatment head 54. Generally, the light source 72 may be located anywhere on/at the housing 52. The light source 72 is arranged to illuminate a processing zone or treatment zone where the treatment head 54 approaches or contacts the user. In FIG. 3, for illustrative purposes, a simplified schematic representation of the light source 72 and further components of the adaptive lighting system 70 is provided.

Further components of the adaptive lighting system 70 are indicated in FIG. 3 by dashed blocks. The adaptive lighting system 70 comprises at least one sensor 74 which is for instance arranged as a light sensor or illumination sensor. The sensor 74 is arranged to sense and detect a current illumination level in the processing zone. Generally, the light source 72 may be located anywhere on/at the housing 52.

In FIG. 3, the adaptive lighting system 70 further incorporates an orientation sensor 76 that is arranged to detect an actual orientation state of the appliance 50. This may involve an absolute and/or relative orientation state. The orientation sensor 76 may be arranged as an inertial-measurement sensor, for instance a multi-axis position sensor, an accelerometer, a gyroscope, or combinations thereof.

Further, a battery 90 is provided and arranged in the housing 52 of the appliance 50. The adaptive lighting system 70 may use a main battery 90 of the appliance 50 which is primarily arranged for powering a primary function of the appliance 50. As the lighting system 70 is arranged in an adaptive fashion, including a control of the light source 72 dependent on an actual illumination level, a considerably energy-saving operation is enabled. Hence, an operating time of the appliance 50 in a wireless operation mode may be substantially maintained.

Needless to say, there may be embodiments of the adaptive lighting system, wherein a separate distinct battery is provided for the lighting system. Further, embodiments of the lighting system may be envisaged wherein at least some components thereof are cable-connected to a mains supply.

Depending on a current illumination level detected by the sensor 74, the light source 72 may be controlled and operated so as to provide a sufficient illumination level and brightness, even in considerably dark environments.

To this end, the adaptive lighting system 70 comprises a lighting control unit 86 which is operatively coupled with the sensor 74 and the light source 72. Hence, signals provided by the sensor 74 may be routed to the control unit 86. Depending on an illumination-indicative value that has been detected by the sensor 74, the control unit 86 may operate the light source 72 so as to achieve and maintain a desired illumination level. This involves in some embodiments that the light source 72 is dimmed or disabled when it has been determined that a sufficient ambient illumination is present.

Further, the control unit 86 may receive and process further information including orientation information, position information, status information, etc. As a consequence, the control unit 86 may control the light source 72 dependent on an augmented information base. For instance, when it is detected that the appliance 50 is currently in an idle mode or even switched off, there is no need to power the light source 72, even if it has been detected by the sensor 74 that the actual (ambient) illumination level is too low.

In some embodiments, the adaptive lighting system 70 is further provided with a so-called control interface 88. Via the control interface 88, the control unit 86 may communicate with remote components and additional control units of the lighting system 70.

Figure 4:
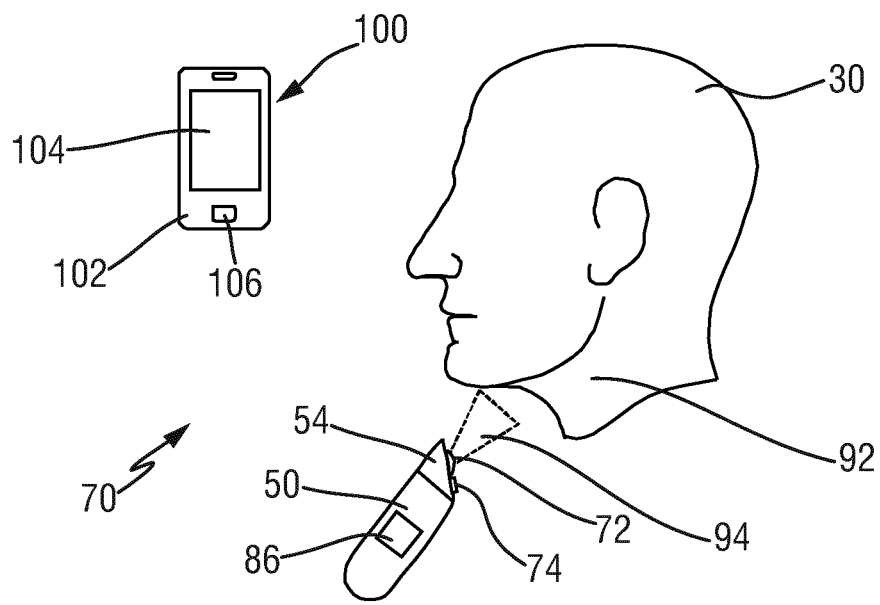
FIG. 4 is a schematic simplified view of an exemplary embodiment of an adaptive lighting system.

Further reference is made to FIG. 4, schematically illustrating a layout of another exemplary embodiment of an adaptive lighting system 70 that is at least similar to the adaptive lighting system described in connection with FIG. 3. In accordance with the embodiment shown in FIG. 4, the adaptive lighting system 70 is at least partially embedded in a personal care appliance 50. The personal care appliance 50 shown in FIG. 4 is again arranged as a hair cutting appliance and involves a respective treatment head 54 arranged to contact a chin or neck region 92 of the subject 30. When the light source 72 is enabled, a defined region is illuminated accordingly, refer to the light cone 94 in FIG. 4.

In the arrangement as shown in FIG. 4, further a mobile computing device 100 is present. By way of example, the mobile computing device 100 is arranged as a mobile phone, a tablet computer, a mobile computer, etc. The mobile computing device 100 comprises processing capacity which may be used for a further control unit 102 that is assigned to the adaptive lighting system 70. Hence, the adaptive lighting system 70 may utilize a control unit 86 arranged at the appliance 50 and a further control unit 102 provided by the mobile computing device 100. The mobile computing device 100 further comprises a display 104 which may be for instance arranged as a touch-sensitive display. Further, user controls 106 may be provided, including status indicators, push buttons, etc.

In some exemplary embodiments, the mobile computing device 100 itself may provide a virtual mirror when a camera unit (front camera arranged in the vicinity of the display) is provided that is operatively coupled with the display so as to display a mirror image when the user is in front of the display.

Functions and features of the adaptive lighting system 70 that require a considerable processing capacity may be assigned to the control unit 102 at the mobile computing device 100. Basic features and functions, however, may be assigned to the control unit 86 arranged at the personal care appliance 50. It goes without saying that the arrangement disclosed in FIG. 4 and the task allocation described above is rather exemplary and shall not be understood in a limiting sense.

Figure 5:
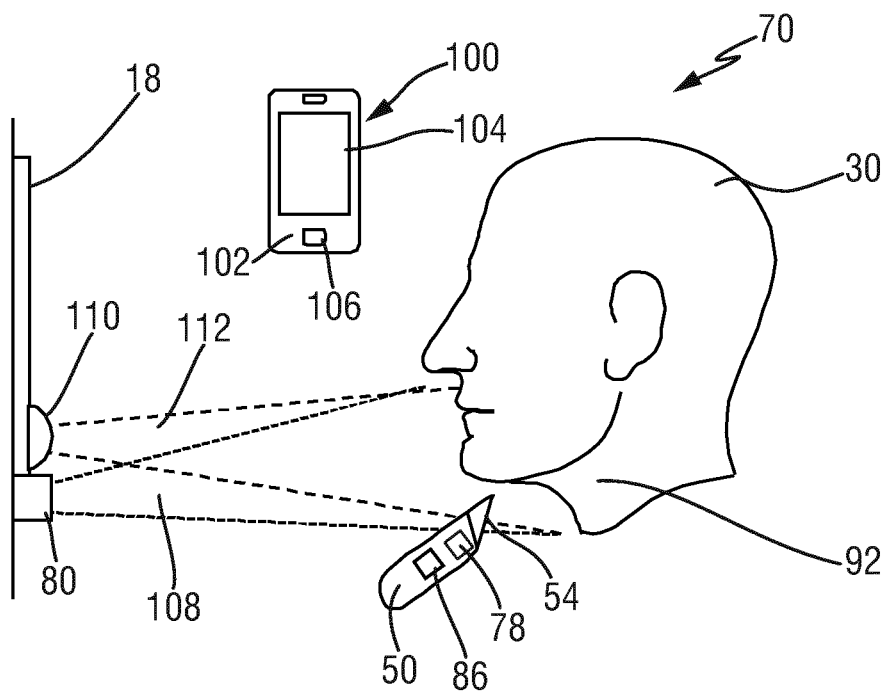
FIG. 5 is a further schematic simplified view of another exemplary embodiment of an adaptive lighting system.

Reference is now made to FIG. 5, illustrating a further exemplary layout of an adaptive lighting system 70. As with the embodiment shown in FIG. 4, a mobile computing device 100 is provided that includes a control unit 102 that is arranged to cooperate with a control unit 86 that is arranged at the level of the personal care appliance 50. Again, the personal care appliance 50 is arranged as a hair cutting appliance comprising a treatment head 54 which may be used, for instance, for shaving or trimming operations at the subject 30. In FIG. 5, the appliance 50 approaches a chin/neck transition 92. At the appliance 50, an operation state sensor 78 is provided. The operation state sensor 78 is arranged to detect an actual operation state of the appliance 50. This may involve an operation mode (trimming or shaving), a primary operation state (on/off), etc. Information provided by the operation state sensor 78 may be used and processed by the control unit 86.

In the arrangement of FIG. 5, there is further schematically illustrated a mirror 18, wherein the subject 30 is arranged in front of the mirror 18. Adjacent to the mirror 18, a relative position sensor 80 is provided. For instance, the relative position sensor 80 may be arranged as a proximity sensor that may sense the presence and/or distance of the appliance 50, particularly of the treatment head 54 thereof. The relative position sensor 80 may cooperate with the operation state sensor 78. By respective controls, refer to the control units 86, 102, the relative position sensor 80 may be coupled with a light source 110. Also the operation state sensor 78 may be operatively coupled with the light source 110. Further, if any, also light sensors, orientation sensors and further types of sensors may be operatively coupled with the light source 110 by appropriate control units 86, 102.

In FIG. 5, reference numeral 108 indicates a sensing field or sensing cone in which the sensor 80 detects an approach of the appliance 50 and/or the subject 30. Further, reference numeral 112 indicates an illuminated field or light cone provided by the light source 110. Hence, the sensor 80 and the light source 110 may be adapted to one another in such a way that the treatment zone is illuminated when the appliance 50 is arranged in the sensing zone 108. Further conditions may be present, including a detection of the actual illumination state, a detection of an actual operation state and/or a detection of an actual orientation state, as discussed above.

In some embodiments, the threshold levels for the illumination control are defined dependent on actual angular and relative positions of the appliance and the user's face with respect to the mirror surface. In some embodiments, also the mobile computing device 100 is provided with diverse sensors. Overall, the system may be capable of real time calibration so as to further enhance the control of the luminance distribution.

Needless to say, the exemplary embodiments presented in connection with FIG. 3, FIG. 4, FIG. 5 and further embodiments in accordance with the present disclosure as presented herein may be combined with one another. This involves that isolated features of one of the embodiments may be applied to and implemented in the context of one of the other embodiments.

Typical examples of further embodiments may involve, but are not limited to, architectural combinatorial diversity of sensors located either on the appliance or the mobile computing device or in the bathroom or in the consumers immediate infrastructure environment, all connected via suitable (not only wireless) protocols. Further, respective sensor combinations may be envisaged.

Figure 6:
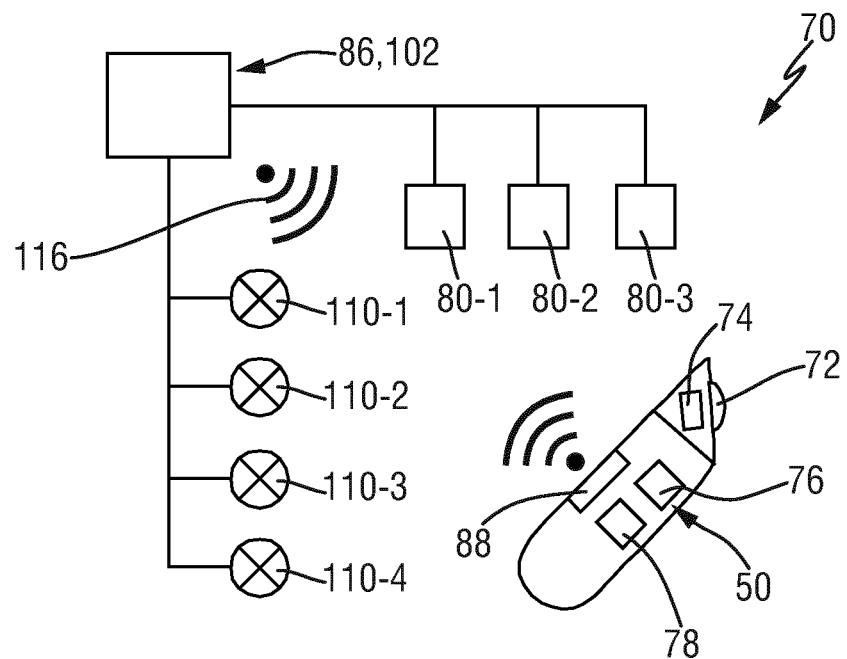
FIG. 6 is a simplified block diagram illustrating yet another exemplary embodiment of an adaptive lighting system.

Further reference is made to the simplified schematic block diagram of FIG. 6, exemplarily illustrating an embodiment of an adaptive lighting system 70. In FIG. 6, the adaptive lighting system 70 is at least partially incorporated in the personal care appliance 50. For instance, the personal care appliance 50 comprises a light source 72 and a light sensor 74 both of which are arranged in the vicinity of or at a treatment head 54 of the appliance. Further, an orientation sensor 76 and an operation state sensor 78 are arranged at the appliance. An interface 88 is provided. Via the interface 88, the appliance 50 may communicate with controls, including control units 86, 102. In FIG. 6, wireless communication is indicated by reference numeral 116.

The adaptive lighting system 70 of FIG. 6 further comprises a set or an array of light sources 110-1, 110-2, 110-3, 110-4. The light sources 110-1, 110-2, 110-3, 110-4 may be separate from the appliance 50 and arranged in a distributed fashion. Further, a set or an array of sensors 80-1, 80-2, 80-3 is provided which are exemplarily arranged as relative position sensors, particularly as proximity sensors. Any light source and sensor involved is operatively coupled with the control arrangement including the control units 86, 102. Hence, an adaptive selective lighting may be provided which illuminates, where necessary, the treatment zone. This may involve that the light sources 72, 110 are dimmed or even disabled when it is detected that an actual illumination level is sufficient for the intended treatment.

Figure 7:
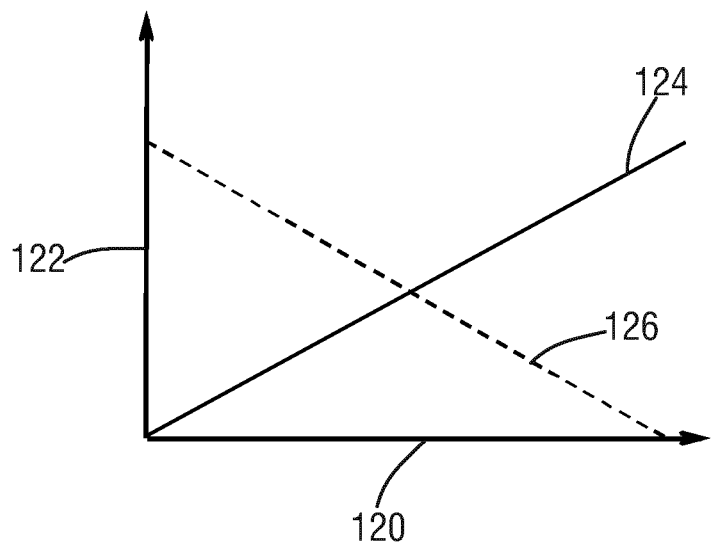
FIG. 7 shows an exemplary illumination level chart illustrating an exemplary inversely proportional relation between a detected actual illumination level and a target output illumination level of a light source of the adaptive light system that is operated in dependency of the actual illumination level.

FIG. 7 shows a simplified chart that illustrates a general relation between an actual illumination level 124 which is present at the treatment zone and attributable to ambient light. An axis 120 is provided as state axis. An axis 122 is provided as an illumination level axis indicating a certain brightness or illumination value. Further, a dashed line 126 indicates a specified target illumination value for a light source or a set of light sources that is controlled by the adaptive lighting system, particularly by a control unit thereof. Hence, when a low actual illumination level 124 is detected, the target illumination level 126 for the light source is considerably high. By contrast, when a sufficiently high ambient illumination level 124 is detected in the treatment zone, a target illumination level 126 for the light source is rather low. This may involve that involved light sources are disabled when a sufficient level of brightness is present.

The chart as shown in FIG. 7 illustrates a general simplified inversely proportional relation between the detected ambient illumination level and the target illumination level for the light source of the adaptive lighting system. Needless to say, non-linear relations and/or system level trade-off design rules may be present. Further, steps in the graph 126 for the set light level at the light source may be present.

Figure 8:
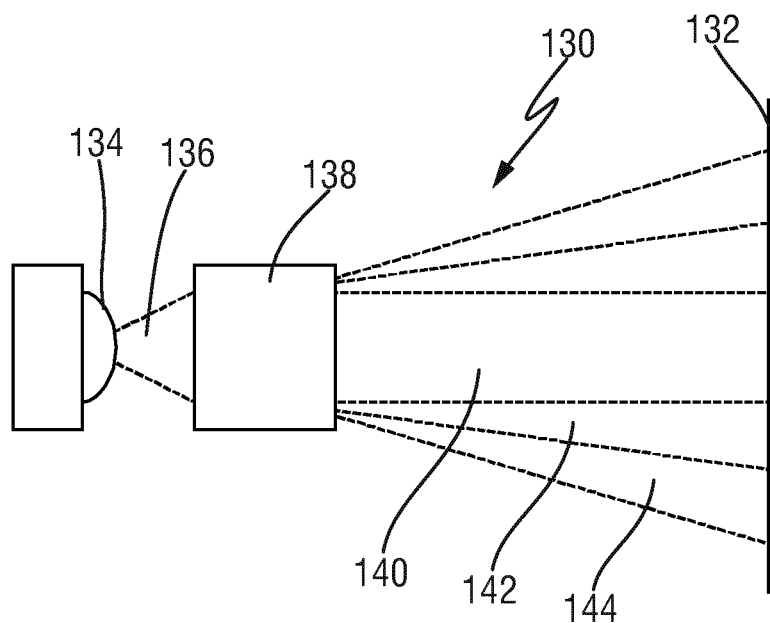
FIG. 8 is a schematic simplified view of a beam shaping arrangement for a light source.

FIG. 8 shows by means of a schematic simplified illustration a beam shaping arrangement 130 that enables an adjustment of an illuminated zone at a target surface 132. In at least some embodiments, the adaptive lighting system 70 incorporates a beam shaping feature enabling an adjustment and a setting of a to-be-illuminated zone.

The beam shaping arrangement 130 involves a light source 134 which is for instance arranged as LED (light emitting diode). An original beam angle/cone is indicated by reference numeral 136. A beam shaping unit 138 is operatively coupled with the light source 134. The beam shaping unit 138 may incorporate respective optical components, control components, etc. Reference numerals 140, 142, 144 indicate exemplary cone sizes that involve a respective adjustment of the illuminated zone at the target surface 132. Reference numeral 140 indicates a parallel or nearly parallel cone 140 including a relatively small illuminated zone at the target surface 132. Reference numeral 144 indicates a relatively wide cone involving a relatively large illuminated zone at the target surface 132. Reference numeral 142 indicates an intermediate cone involving a medium size illuminated zone at the target surface 132. Beam shaping may further involve that a brightness level or illumination level is higher for the narrow cone 140 than for the wide cone 144. In some embodiments, the beam shaping unit 138 is further arranged to adjust a brightness distribution level within the illuminated zone. This may involve that a center brightness is higher than a boundary brightness.

It is noted that further embodiments may be envisaged which enable a definition and an adjustment of an illuminated zone. In a fairly simple embodiment, a plurality of light sources may be provided which may be respectively controlled. Hence, when only a subset of the light sources is actuated, a smaller zone than in the case when a greater number of light sources are enabled is illuminated.

Figure 9:
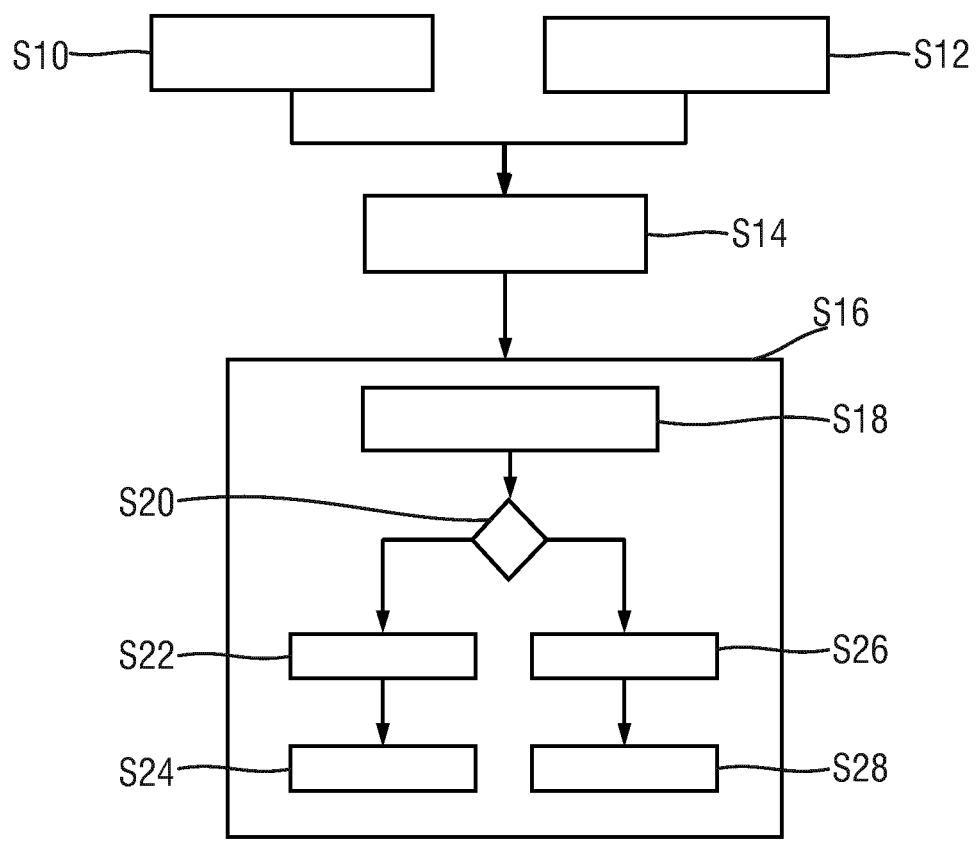
FIG. 9 is a simplified schematic block diagram illustrating an embodiment of a method of operating an adaptive lighting system in accordance with the present disclosure.

Further reference is made to FIG. 9 showing a block diagram schematically illustrating an exemplary embodiment of a method of operating an adaptive lighting system for a personal care appliance.

The method involves a step S10 relating to a provision of at least one light source. Further, a step S12 is provided involving a provision of at least one sensor, particularly at least one light sensor. As discussed further above, also other types of sensors may be used. However, the sensors are capable of mediately or directly detecting an illumination level-indicative value.

In some embodiments, the at least one light source and the at least one sensor may be arranged at the appliance. However, in further embodiments, also a separate arrangement of the at least one light source and/or the at least one sensor may be envisaged.

A further step S14 involves an operation of the appliance. For instance, the appliance may be arranged as a hair cutting appliance and may be therefore used for trimming, shaving, etc.

An adaptive lighting control step S16 may follow. The step S16 includes a substep S18 involving sensing a current illumination level by means of the at least one sensor. A decision step S20 may follow. In the step S20, a check is performed whether or not the detected illumination level exceeds or falls below certain thresholds. Depending on the outcome of the decision step S20, respective control measures may be taken. In case it is detected that the actual illumination level is smaller than a defined minimum illumination level, a substep S22 may follow which involves a definition and setting of a target illumination level for the at least one light source. Hence, in a following substep S24, the at least one light source may be operated accordingly.

When it is decided in the step S20 that a sufficient illumination level is actually present which even exceeds a defined range, a substep S26 may follow which involves a definition and setting of a new (lower) target illumination value for the light source. This may even involve a zero-value, i.e. a disabling command. In a subsequent substep S28, the at least one light source may be operated accordingly. A further outcome of the decision substep S20 may be that a current state is maintained when the detected illumination level is in a defined range.

Operating the adaptive lighting system may be further simplified when a reduced number of operation states for the at least one light source is present. For instance, a simple light source may be provided which is not arranged for dimming. Rather, the light source may be either switched on or switched off. Hence, in this embodiment, the involved sensor may detect whether or not an actual level is above or below a certain threshold. As a direct consequence, it may be decided that the light source is to be switched on or switched off.

As discussed above, further influencing factors may be present, involving operation state signals, orientation state signals, position signals, etc.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A grooming system comprising an adaptive lighting system and a personal care appliance, particularly a hair cutting appliance,
   the adaptive lighting system comprising:
   at least one sensor that is arranged to detect an illumination-indicative value in the vicinity of a treatment head of the appliance,
   at least one light source that is arranged to illuminate a treatment zone,
   a lighting control unit operatively coupled with the at least one sensor and the at least one light source,
   wherein the lighting control unit is arranged to control the at least one light source dependent on the illumination-indicative value detected by the at least one sensor, and
   wherein the lighting control is arranged to increase a target illumination level when a detected actual illumination level is low, and to decrease a target illumination level when a detected actual illumination level is high.

2. The grooming system as claimed in claim 1, wherein the lighting control unit is arranged to apply at least one of the following adaptive measures:
   enable or disable the at least one of the at least one light source,
   adjust a luminous power level of at least one of the at least one light source, and, insofar there are at least two light sources,
   define and adjust an illuminated zone dependent on the illumination level detected by the at least one sensor.

3. The grooming system as claimed in claim 1, wherein the lighting control unit is arranged to control a luminance distribution value dependent on an illumination level detected by the at least one sensor.

4. The grooming system as claimed in claim 1, wherein the lighting control unit is further arranged to adjust the target illumination level dependent on at least one of a relative orientation and a relative position of the appliance.

5. The grooming system as claimed in claim 1, wherein a set of sensors is provided that is arranged in a distributed fashion, and wherein the set of sensors is operable to sense a set of illumination-indicative values.

6. The grooming system as claimed in claim 1, wherein a set of light sources is provided that is arranged in a distributed fashion, and wherein the lighting control unit is arranged to control at least one light source of the set of light sources independently of the remaining light sources.

7. The grooming system as claimed in claim 1, wherein the at least one sensor is arranged at the appliance.

8. The grooming system as claimed in claim 1, wherein the at least one sensor is separate from the appliance.

9. The grooming system as claimed in claim 1, wherein the at least one light source is arranged at the appliance.

10. The grooming system as claimed in claim 1, wherein the at least one light source is remote from the appliance.

11. The grooming system as claimed in claim 1, further comprising at least one of the following:
    an orientation sensor arranged to detect an actual orientation of the appliance,
    wherein the lighting control unit is arranged to control the at least one light source dependent on an actual orientation of the appliance,
    an operation state sensor arranged to detect an actual operation state of the appliance,
    wherein the lighting control unit is arranged to control the at least one light source dependent on an actual orientation of the appliance, and
    a relative position sensor, particularly at least one proximity sensor, arranged to detect an actual relative position of the appliance,
    wherein the lighting control unit is arranged to control the at least one light source dependent on an actual position of the appliance.

12. The grooming system as claimed in claim 1, wherein the lighting control unit is at least partially incorporated in a mobile computing device, particularly a mobile phone, a tablet computer or a mobile computer, wherein the lighting control unit is arranged to communicate with the at least one sensor and the at least one light source in a wireless fashion.

13. The grooming system as claimed in claim 1, wherein the lighting control unit is arranged to dim or deactivate a light intensity and/or an illuminated field of view when as a respective position/orientation indicates that currently no primary processing treatment is planned.

14. A method of operating an adaptive lighting system of a grooming system comprising a personal care appliance, particularly a hair cutting appliance, the method comprising:
- providing at least one light source that is arranged to illuminate a processing zone for the appliance,
- providing at least one sensor that is arranged to detect an illumination level in the vicinity of a treatment head of the appliance,
- controlling the at least one light source dependent on an illumination level detected by the at least one sensor, involving:
  - increasing a target illumination level when a detected actual illumination level is low, and
  - decreasing a target illumination level when a detected actual illumination level is high.

15. A computer program comprising program code means for causing an adaptive lighting system of a grooming system comprising a personal care appliance, particularly a hair cutting appliance, to carry out the steps of the method as claimed in claim 14 when said computer program is carried out on a computing device that is operatively coupled with or forms part of the adaptive lighting system.

* * * * *